United States Patent [19]

Robertson et al.

[11] Patent Number: 4,922,721
[45] Date of Patent: May 8, 1990

[54] TRANSPORTER UNIT WITH COMMUNICATION MEDIA ENVIRONMENTAL STORAGE MODULES

[75] Inventors: William M. Robertson, Lewisville; Charles A. Sharp, III, Garland; Edward J. Burke, Plano, all of Tex.

[73] Assignee: Marlow Industries, Inc., Dallas, Tex.

[21] Appl. No.: 345,942

[22] Filed: May 1, 1989

[51] Int. Cl.⁵ .............................................. F25B 21/02
[52] U.S. Cl. ...................................... 62/3.61; 62/3.3; 62/237; 62/243
[58] Field of Search ................. 62/3.61, 3.3, 243, 236, 62/237, 448

[56] References Cited

U.S. PATENT DOCUMENTS

| | | | |
|---|---|---|---|
| 2,973,627 | 3/1961 | Lackey et al. | 62/3.61 |
| 3,872,686 | 3/1975 | Patrie | 62/237 |
| 3,886,346 | 5/1975 | Meyers | 62/3.61 X |
| 4,823,554 | 4/1989 | Trachtenberg et al. | 62/3.3 |
| 4,838,911 | 6/1989 | Robertson et al. | 62/3.3 |

*Primary Examiner*—Lloyd L. King
*Attorney, Agent, or Firm*—Alva H. Bandy

[57] ABSTRACT

A transport apparatus, for hauling data storage media requiring environmental protection to and from a permanent storage site, includes a portable transport module and a transport cart. The transport module includes an insulated housing having guides for receiving shelves adapted to hold motion picture films, audio and video tapes, and photography film and provide ready access to and protection against movement during transit. A thermoelectric heat pump assembly heats or cools the interior of the insulated housing. A temperature sensor and a humidity sensor in the housing produce temperature and humidity measurement signals. Connectors are provided to connect power to the thermoelectric heat pump assembly and to output the temperature and humidity measuring signals. An ancillary power supply and control system are included to operate the transport module when separated from the transport cart. The transport cart has a platform with tie down cleats, wheels attached to the platform, wheel locks for securing the transport cart against rolling, a rechargeable battery power pack and compartment, connectors corresponding to the connectors of the transport module connect the rechargeable battery power pack to the thermoelectric heat pump assembly and receive the temperature and humidity measuring signals. An upright member of the platform supports a handle for pushing the transport cart and a programmable controller having a processor, time and date clock, memory, display, keypad, and timers. The programmable controller receiving the temperature and humidity measurement signals and controls the operation of the thermoelectric heat pump assembly for maintaining programmed temperatures during programmed time periods.

14 Claims, 2 Drawing Sheets

TRANSPORTER UNIT WITH COMMUNICATION MEDIA ENVIRONMENTAL STORAGE MODULES

This invention relates to material handling transports and more particularly to a transport apparatus for moving material requiring a temperature and humidity controlled environment.

BACKGROUND OF THE INVENTION

Transport units exist for carrying material from a storage area to a user destination. Examples of such transport units are wheeled platforms with or without motor drives, and wheeled shelves. These devices have been used to transport communication media such as motion picture film, audio, video, and computer discs or tapes, photographic film and plates or the like to and from a permanent environmentally controlled storage area to a user area. Nevertheless, use of these typical transport devices has not provided the communication media protection from potential damage resulting from sudden temperature and humidity changes and rough handling attending the removal of the medial from the environmental controlled permanent storage area, transport to the user area and subsequent return to the permanent storage area. Particularly damaging to the communication media is the sudden changes in temperature occurring when the media is removed from and returned to the environment controlled permanent storage area. These media damaging factors have an adverse effect on the mean time before failure of the media and particularly so when the media is used for long term storage of permanent record material.

SUMMARY OF THE INVENTION

Accordingly an object of the invention is to provide a programmable mobile transporter programmable to maintain temperature and humidity at a steady state or allow the temperature and humidity to gradually increase or decrease in at least one transport module within a specified time period.

Another object of the invention is to provide a mobile transport operable either on a rechargeable internal power pack or an external power supply.

Still another object of the invention is to provide a mobile transport which is small enough to fit into a van or panel truck for transport from a permanent storage building to a separate user building.

Yet another object of the invention is to provide a mobile transport unit which is light enough for van loading or unloading by one person.

A further object of the invention is to provide a mobile transport unit which can be demobilized to prevent movement either during transport or while left at a user station pending use or after use waiting return to the permanent storage site.

Still a further object of the invention is to provide a mobile transport unit including portable transport modules securable to carrier for transport.

Yet a further object of the invention is to provide a mobile transport having a programmable controller connectable to transport modules for controlling operation during movement.

Still yet a further object of the invention is to provide a mobile transport having at least one removable environmental secure chamber including adjustable shelves to hold different combinations of material.

Briefly stated the invention comprises a small, light weight, mobile, transport cart with one or more removable transport modules. The transport modules include environmental controlled chambers or containers having shelves adapted to hold the same or different combinations of material types. The transport unit is adapted to carry the portable transport modules from a permanent storage area either directly to a user area conveniently located with respect to the storage area or indirectly via a van or small truck to a user area in a building remote to a storage area building.

Depending upon the available space and user requirements the transport cart may be used to haul one or more or all of the modules to one user area for removal and use at the user area, or one or more or all of the modules hauled to a user area and retained on board the transport cart for use at a user station. To do this, the transport cart has dc/ac power packs and a display, time and date clock, keypad and timer connected to a programmable controller with the dc/ac power pact of the transport cart adapted to supply power to the modules when on board and controlled by the transport's controller when programmed using the keypad for any desired temperature and humidity, and/or to allow the modules interior temperature to gradually increase or decrease within a specified time period set for the timer.

BRIEF DESCRIPTION OF THE DRAWINGS

Other objects and features of invention will become more readily apparent from the following detailed description when read in conjunction with the drawings in which.

DETAILED DESCRIPTION OF PREFERRED EMBODIMENTS OF THE INVENTION

Figure 1:
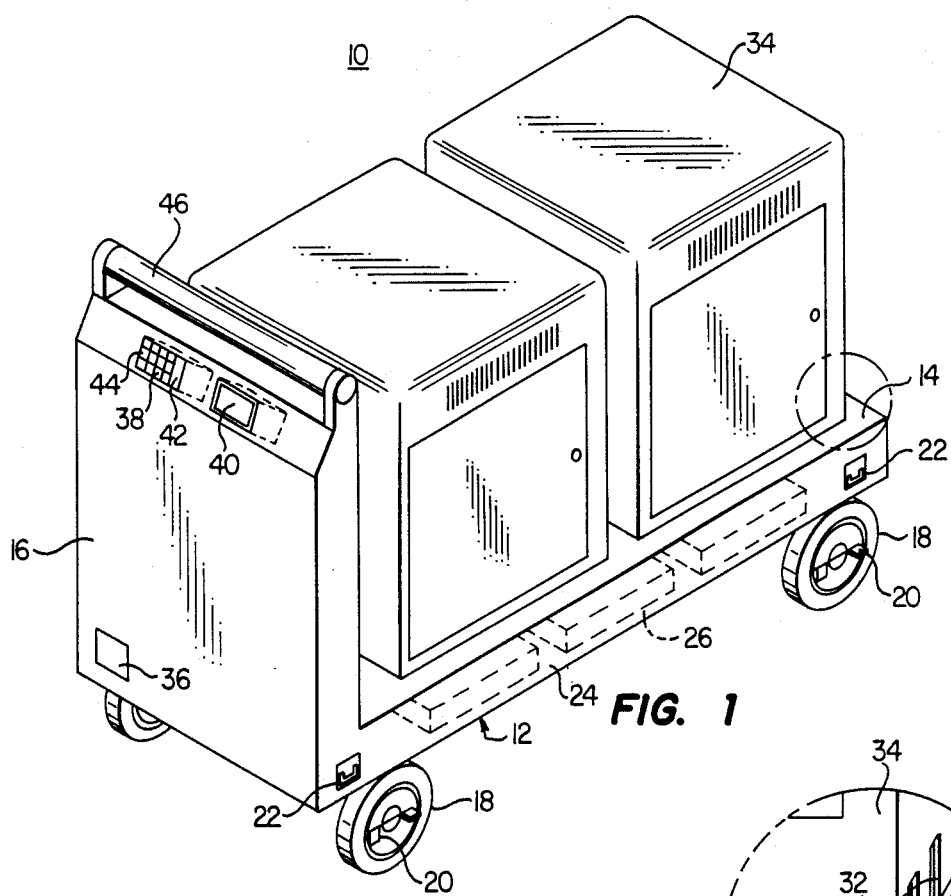
FIG. 1 is an isometric view of a first embodiment of the transport unit of this invention.
Figure 2:
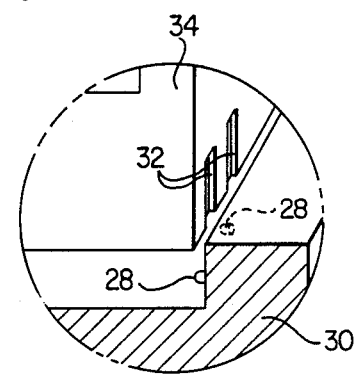
FIG. 2 is a partial view partly in section of the transport unit of the first embodiment of the invention.

Referring now to FIG. 1, the transport unit 10 constituting the first embodiment of the invention comprises a transport cart 12 having a platform member 14 and a vertical upright member 16. The platform member 14 is mounted upon wheels 18 equipped with locking means 20 for locking the wheels against rolling. Tie down cleats or rings 22, of which only two of four are shown, are attached to the platform 14 as shown. The platform 14 has a compartment 24 for rechargeable battery power packs 26. The rechargeable battery power packs 26 are connected to spring loaded connector pins 28 (FIG. 2) mounted on a retaining flange 30 of the platform 14 for engaging connector fingers 32 attached to a transport module 34. The connector fingers 32 are for connecting power to a thermoelectric cooling system, and humidity and temperature sensors to a programmable controller. A suitable thermoelectric cooling system is a thermoelectric heat pump sold by Marlow Industries.

The vertical member 16 (FIG. 1) of the transport cart 12 includes an ac/dc power cord compartment 36 containing a typical power cord (not shown) for connecting the transport cart 12 to an external ac power source for recharging the rechargeable battery power packs 26. A programmable computer 38 and automatic timers 40 (if needed) are attached adjacent to the top of the vertical member 16 for controlling operation of the thermoelectric cooling system. The programmable computer 38 is typical in that it includes a microprocessor (not shown), a liquid-crystal display 42 for displaying programmed parameters, a time and date clock (not shown), a keypad 44 for entering program information, a time date clock (not shown), and a storage memory (not shown). A handle 46 is attached to the top of the vertical member 16 for providing a convenient means for either pushing or pulling the transport cart. When properly positioned on the transport cart the power connection fingers engage the spring loaded power pins of the removable, environmental chamber modules 34.

Figure 3A:
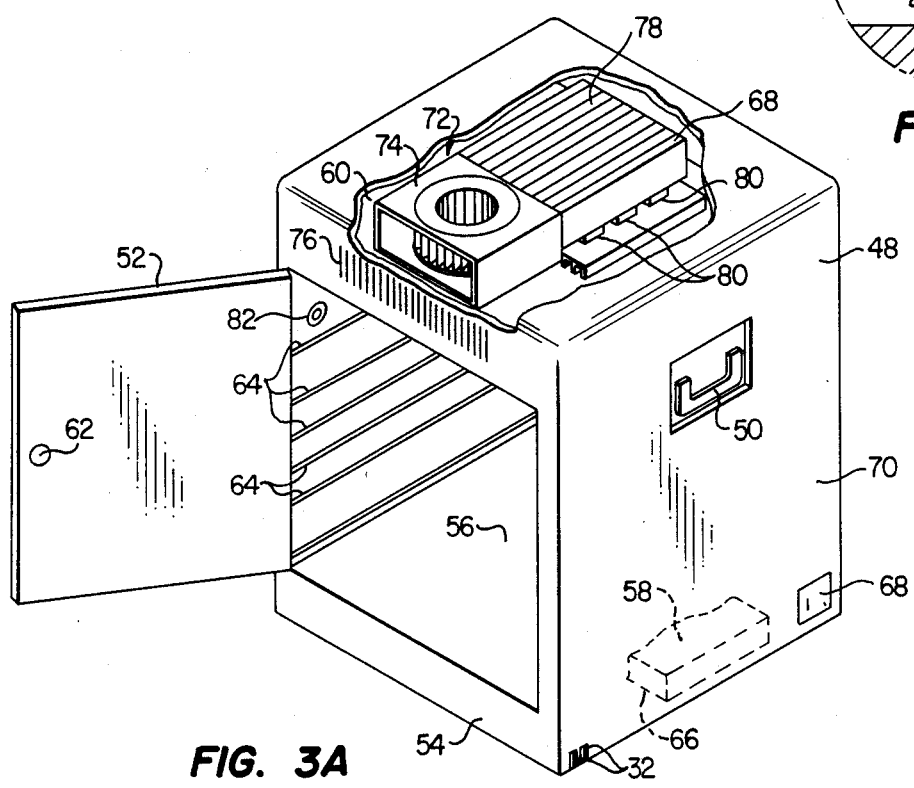
FIG. 3a is an isometric view of the removable transport module for the first embodiment with a portion broken away to show the thermoelectric cooling system.

Each transport module 34 (FIG. 3A) includes an insulated housing 48 having a pair of collapsible handles 50 (only one of which is shown) on opposing sides for use in moving the module to and from the transport cart. A door 52 is hingedly attached to a first side 54 of the housing to provide ingress and egress to an environmental chamber compartment 56 between first and second compartments 58 and 60. A mechanical lock 62 is provided to lock the door to the side 54. The chamber compartment 56 is provided with a plurality of shelve positioning guides 64 attached to opposing sides. The compartment 58 has mounted therein rechargeable battery power packs 66 and ac/dc power cords (not shown). The power cords are accessed through a door 68 in side 70 of the housing. The connector fingers 32 are attached to this side 70. While compartment 60 has mounted therein a thermoelectric cooling system 72.

Figure 3B:
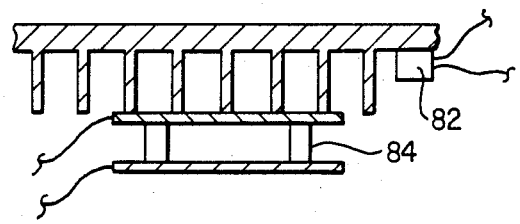
FIG. 3b is a partial view partly in section of the transport module with a portion broken away to show the arrangement of the dehumidifier and temperature sensor.

The thermoelectric cooling system 72 includes an air circulating fan 74 positioned between louvers 76 formed inside 54 of the housing and heat sink fins 78 for drawing and circulating air through the heat sink fins and venting the air through the louvers. The heat sink fins 78 are attached to thermoelectric cooling elements 80, and the elements 80 are attached to a heat sink plate mounted in the top of the environmental chamber together with a temperature sensing transducer 82 and a thermoelectric heat pump type dehumidifier 84 (FIG. 3B) for controlling the temperature and humidity thereof. The chamber humidity can also be controlled manually using a desicator drying agent such as calcium chloride, for example. To meet safety requirements for the transport of nitrate film a typical fire extinguisher quick-connect and release inlet not shown is provided.

Figure 4:
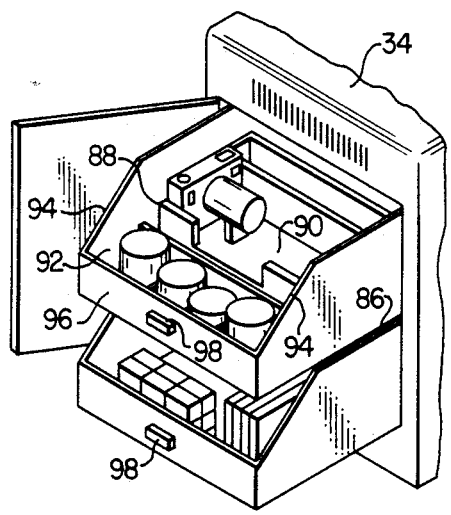
FIGS. 4, 5, and 6 are partial views of various interiors of the removable chamber modules of the first embodiment.
Figure 5:
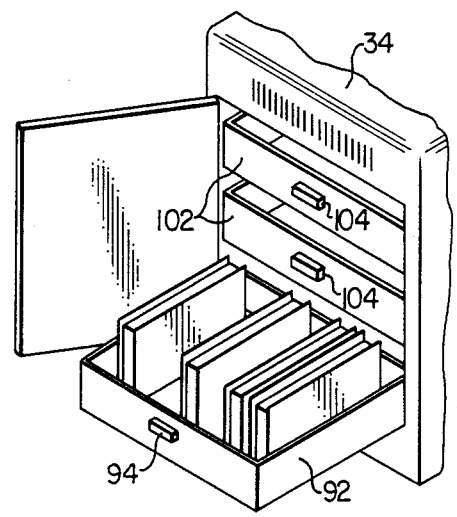
Figure 6:
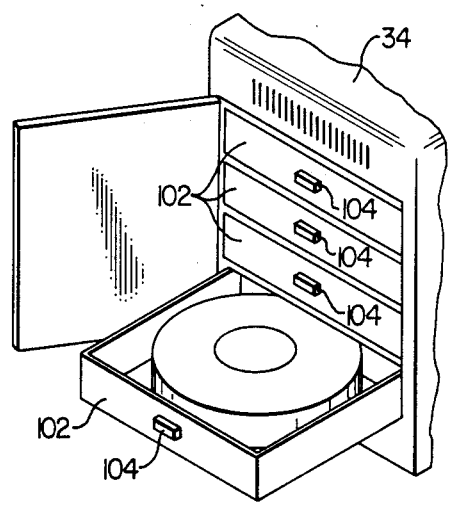

Referring now to FIGS. 4, 5, and 6, for a description of shelving suitable for use in conjunction with the environmental chamber for commercial photography equipment, video cassettes, and motion picture film, audio and computer tapes and discs. The shelves of each are provided with runners 86 mating with guides 64 of the environmental chamber for forming drawer type shelves.

Shelving for the environmental chamber (FIG. 4) includes shelving suitable for storing commercial photography equipment and film. The shelving includes a first shelf having a vertical partition 88 and a horizontal partition 90 dividing the shelf into first and second compartments. The first compartment is for storing cameras and the partition 88 has a recessed portion providing ready access to the first compartment. The second compartment 92 has a portion extending beneath the first compartment and is for film storage. Opposing sides 94 of the second compartment taper downwardly to the top edge of a front side 96 having a heighth sufficient for ready access to film stored in the shelf. A handle 98 is attached to the front side 96 for removing the first shelf from the chamber 56. The second shelf is similar to the first shelf, but has the partitions 88 and 90 removed to accommodate other photography equipment.

While, shelving for the video cassettes (FIG. 5) and motion picture film, audio and computer tapes and discs (FIG. 6) include shelves 102 having sides of a heighth substantially lower than that of typical video cassettes to facilitate accessing the cassettes, and front sides having handles 104 for removing the shelves from the environmental chamber. For the motion picture film, audio and computer tapes and discs, removable partitions provide separate compartments for the various sizes of these items. The size of the shelving and the environmental chamber is determined by the typical size of the reels to be accommodated; e.g. 70 mm film, 35 mm film, 16 mm film, audio, video, and computer tapes, and audio, video and computer discs. Various combinations of the shelving of FIGS. 4, 5, and 6 can be used to meet user needs.

In operation the keypad is used to set the clock to the time of day and date, and to program into memory the desired temperature and/or humidity settings together with the timers time period settings for the various temperatures programmed into the memory. In this manner temperature and humidity can be maintained at a steady state or "staged" either up from cold storage to ambient temperature or down from ambient temperature to cold storage. Staging or temperature maintenance can be accomplished during transit.

In operation, many scenario's can be followed, for example, with the transport modules mounted on the transport cart, the microprocessor is powered on and programmed for the desired function, e.g. transporting the communication media from a permanent cold storage site to a user area using a desired temperature setting or cycle described above or different combinations of those described above. After power on the microprocessor controls the operation of the thermoelectric heat pump of the transport module to achieve the set temperature in the environmental chamber, and the dehumidifier to achieve the set humidity, and the transport cart is wheeled to the permanent storage site. At the storage site, either the shelves of the transport module or the transport module are removed, taken inside the storage area and the desired media placed into the appropriate shelves. The shelves are then locked into the transport module and the transport module secured to the transport cart using the tie down rings.

The transport cart is then wheeled to a loading zone and loaded into a van. In the van, the wheels of the transport cart are locked to prevent rolling in the van. The van then transports the transport cart to the loading zone of the user area, the wheels unlocked, and the transport cart removed for rolling to the user. At the user site, the wheels of the transport cart are locked and the transport cart plugged into an ac power source for providing power to the transport modules as required pending use. If one only of the transport modules is to be used at the particular user site, the appropriate transport module is un-tied, removed from the transport cart, at which time the battery power pack supplies operating power, until connection is made to an ac power source. Then the transport cart can be wheeled to a second user site and the operation repeated or if the transport cart is not required the transport module can be left on the transport cart until the media is to be returned to the permanent storage area.

Although a single embodiment of the invention has been described, it will be apparent to a person skilled in the art that various modifications to the details of construction shown and described may be made without departing from the scope of this invention.

What is claimed is:

1. A transport apparatus for carrying data storage media requiring environmental protection comprising:
    a transport module including an insulated housing adapted to receive data storage media, a heating or cooling means connected to the insulated housing for heating or cooling the interior of the insulated housing, a temperature sensing means mounted within the insulated housing for sensing the temperature thereof and outputting signals representative thereof, and a connector means connected to the heating or cooling means and the temperature sensing means; and
    a transport cart having a connector means corresponding to the connector means of the transport module for connection thereto, a source of power means mounted on the transport cart and connected to the connector means of the transport cart for supplying operating power to the heating or cooling means of the transport module, a programmable controller including means connected to the connector means of the transport cart for receiving the temperature indicating signals of the temperature sensor means and controlling operation of the heating and cooling means of the transport module for regulating the temperature of the insulated housing.

2. A transport apparatus according to claim 1, wherein the heating or cooling means is a thermoelectric heat pump.

3. A transport apparatus according to claim 1 further including a dehumidifier means mounted in the insulated housing of the transport module.

4. A transport apparatus according to claim 3 wherein the dehumidifier means includes a drying agent for absorbing moisture in the insulated housing.

5. A transport apparatus according to claim 3 wherein the dehumidifier means includes a thermoelectric heat pump and a humidity sensing means mounted in the insulated housing and connected, respectively, to corresponding connectors of the transport module connector, the transport cart's connector means includes corresponding connectors for the thermoelectric heat pump and humidity sensing means of the dehumidifier means, said source of power of the transport cart being connected to the thermoelectric heat pump for supplying operating power to the thermoelectric heat pump of the dehumidifier means, and the programmable controller includes means connected to the connector for the humidity sensing means for receiving the humidity indicating signals and controlling operation of the thermoelectric heat pump of the dehumidifier means responsive to the received humidity indicating signals.

6. A transport apparatus according to claim 5 wherein the thermoelectric heat pump of the dehumidifier means is mounted on the heating or cooling means of the transport module.

7. A transport apparatus according to claim 1 wherein the insulating housing further includes a plurality of guides mounted on opposing sides for receiving a plurality of removable shelves, said shelves being adapted substantially to provide ready access to and movement control of the data storage media being transported.

8. A transport apparatus according to claim 1 wherein the temperature sensing means of the transport module is mounted on the heating or cooling means.

9. A transport apparatus according to claim 1 wherein the transport module further includes an ac/dc power source means and power control means for operating the transport module when removed from the transport cart.

10. A transport apparatus according to claim 1 wherein the source of power means mounted on the transport cart includes a rechargeable battery power pack.

11. A transport apparatus according to claim 10 wherein the source of power means includes ac/dc means for connecting an ac source of power for recharging the battery power pack.

12. A transport apparatus according to claim 1 wherein the source of power means includes an ac/dc means for connecting the transport cart source of power means to an ac power source and converting the ac power to dc power for the heating or cooling means.

13. A transport apparatus according to claim 1 wherein the transport cart includes a platform, tie down means attached to the platform for use in securing the transport module to the platform, a plurality of wheels attached to the platform for rolling the platform, and a plurality of locks attached to the wheels for locking the wheels against movement.

14. A transport apparatus according to claim 1, wherein the programmable controller includes a time and date clock, a memory, and processor, a display and keypad connected to the processor for programming preselected temperatures and time periods for corresponding preselected temperatures for use by the processor in controlling operation of the heating or cooling means.

* * * * *